(12) United States Patent
Pyle et al.

(10) Patent No.: US 9,416,720 B2
(45) Date of Patent: Aug. 16, 2016

(54) SYSTEMS AND METHODS FOR CONTROLLING A VARIABLE SPEED WATER PUMP

(75) Inventors: Tristan Pyle, Bothell, WA (US); René M. P. A. Nevels, Heeze (NL)

(73) Assignee: PACCAR Inc, Bellevue, WA (US)

(*) Notice: Subject to any disclaimer, the term of this patent is extended or adjusted under 35 U.S.C. 154(b) by 839 days.

(21) Appl. No.: 13/309,457

(22) Filed: Dec. 1, 2011

(65) Prior Publication Data
US 2013/0142669 A1   Jun. 6, 2013

(51) Int. Cl.
F25B 41/00 (2006.01)
F01P 7/16 (2006.01)
F04B 49/20 (2006.01)
(Continued)

(52) U.S. Cl.
CPC ............ *F01P 7/164* (2013.01); *B60H 1/00885* (2013.01); *B60H 1/08* (2013.01); *F04B 49/20* (2013.01); *F01P 7/16* (2013.01); *F01P 2025/13* (2013.01); *F01P 2025/62* (2013.01); *F01P 2060/045* (2013.01); *F01P 2060/06* (2013.01); *F01P 2060/08* (2013.01); *F24F 11/001* (2013.01); *F25B 49/00* (2013.01); *F25B 2600/02* (2013.01); *F25B 2600/025* (2013.01); *F25B 2600/0253* (2013.01); *F25B 2600/13* (2013.01); *F25B 2700/00* (2013.01)

(58) Field of Classification Search
CPC ... F24F 2011/001; F24F 11/001; F25B 49/00; F25B 2700/00; F25B 2600/02; F25B 2600/025; F25B 2600/0253; F25B 2600/13; F01P 7/164

USPC .............................. 62/208; 123/41.01, 41.02
See application file for complete search history.

(56) References Cited

U.S. PATENT DOCUMENTS 4,434,749 A   3/1984   Morita
4,577,604 A   3/1986   Hara
(Continued)

FOREIGN PATENT DOCUMENTS

DE   197 12 479 A1    10/1998
DE   10 2005 059 581 A1   6/2007
(Continued)

OTHER PUBLICATIONS

International Search Report and Written Opinion mailed Mar. 28, 2013, issued in corresponding International Application No. PCT/US2012/067252, filed Nov. 30, 2012, 6 pages.
(Continued)

*Primary Examiner* — Marc Norman
*Assistant Examiner* — David Teitelbaum
(74) *Attorney, Agent, or Firm* — Christensen O'Connor Johnson Kindness PLLC (57) ABSTRACT

Systems and methods for providing an improved strategy for controlling a variable speed water pump in a vehicle. In some embodiments, more than one water pump speed function is calculated based on values obtained from vehicle sensors, and a controller chooses among the water pump speed function results to set a water pump speed. In some embodiments, the water pump speed is increased when driveline torque is greater than a threshold amount for an amount of time that varies based on the driveline torque. In some embodiments, ambient temperature is considered while determining whether the water pump should provide full coolant flow to an auxiliary coolant loop of a trailer.

5 Claims, 8 Drawing Sheets

(51) Int. Cl.
  *B60H 1/08* (2006.01)
  *B60H 1/00* (2006.01)
  *F24F 11/00* (2006.01)
  *F25B 49/00* (2006.01)

(56) References Cited

U.S. PATENT DOCUMENTS

| | | | |
|---|---|---|---|
| 4,798,050 A | 1/1989 | Nakamura | |
| 5,036,803 A | 8/1991 | Nolting | |
| 5,215,044 A | 6/1993 | Banzhaf | |
| 5,266,010 A | 11/1993 | Tanaka | |
| 5,267,835 A | 12/1993 | Schabdach | |
| 5,352,095 A | 10/1994 | Tanaka | |
| 5,586,539 A | 12/1996 | Yonekawa | |
| 5,846,056 A | 12/1998 | Dhindsa | |
| 6,152,088 A | 11/2000 | Occella | |
| 6,227,153 B1 | 5/2001 | Till | |
| 6,520,125 B2 | 2/2003 | Suzuki | |
| 6,530,426 B1* | 3/2003 | Kishita | B60H 1/00428 123/339.17 |
| 6,651,761 B1 | 11/2003 | Hrovat | |
| 6,655,135 B2 | 12/2003 | Oka | |
| 6,705,254 B1* | 3/2004 | Grabowski et al. | 123/41.29 |
| 6,739,290 B2 | 5/2004 | Iwasaki | |
| 6,810,838 B1* | 11/2004 | Hellman | 123/41.28 |
| 6,869,425 B2 | 3/2005 | Briggs | |
| 6,904,875 B2 | 6/2005 | Kilger | |
| 6,909,283 B2 | 6/2005 | Emeric | |
| 6,955,141 B2 | 10/2005 | Santanam | |
| 6,986,646 B2 | 1/2006 | Bettenhausen | |
| 7,011,049 B2* | 3/2006 | Tomasseli et al. | 123/41.02 |
| 7,055,486 B2 | 6/2006 | Hoff | |
| 2003/0221638 A1 | 12/2003 | Haase | |
| 2004/0141849 A1 | 7/2004 | Deneir | |
| 2005/0016472 A1* | 1/2005 | Surnilla | 123/41.02 |
| 2005/0205683 A1* | 9/2005 | Schmitt et al. | 237/12 |
| 2006/0005790 A1 | 1/2006 | Braun | |
| 2006/0157000 A1* | 7/2006 | Lutze et al. | 123/41.02 |
| 2006/0263651 A1 | 11/2006 | Fagley | |
| 2007/0234980 A1* | 10/2007 | Namuduri et al. | 123/41.44 |
| 2008/0196700 A1* | 8/2008 | Chyo et al. | 123/541 |
| 2010/0058752 A1 | 3/2010 | Kamoshida | |
| 2010/0139582 A1* | 6/2010 | Bilezikjian et al. | 123/41.02 |
| 2010/0155036 A1 | 6/2010 | Andris | |
| 2010/0218494 A1 | 9/2010 | Yasuda | |
| 2011/0132291 A1 | 6/2011 | Ulrey | |

FOREIGN PATENT DOCUMENTS

| | | |
|---|---|---|
| EP | 0894953 A1 | 2/1999 |
| EP | 1 164 270 A1 | 12/2001 |
| EP | 2 014 889 A1 | 1/2009 |
| EP | 2 034 168 A1 | 3/2009 |
| EP | 2 148 059 A2 | 1/2010 |
| FR | 2 793 842 A1 | 11/2000 |
| GB | 603132 A | 6/1948 |
| GB | 2 157 879 A | 10/1985 |
| GB | 2 357 141 A | 6/2001 |
| JP | 57-068514 A | 4/1982 |
| JP | 2002-81408 A | 3/2002 |
| JP | 2006-307672 A | 11/2006 |
| JP | 2010-240541 A | 10/2010 |

OTHER PUBLICATIONS

Extended European Search Report mailed Apr. 21, 2015, issued in corresponding European Application No. EP12854433, filed Nov. 30, 2012, 9 pages.
Office Action mailed Mar. 31, 2016, issued in corresponding European Application No. EP 12 854 433.5, filed Nov. 30, 2012, 5 pages.
Examination Report dated Apr. 5, 2016, issued in corresponding Australian Application No. AU 2012345840, filed Nov. 30, 2012, 4 pages.

* cited by examiner

SYSTEMS AND METHODS FOR CONTROLLING A VARIABLE SPEED WATER PUMP

BACKGROUND

Traditional internal combustion engines include a cooling system in which water (or other coolant) is fed through the engine block and then through a radiator by a water pump to dissipate excess heat and to keep the engine temperature at an acceptable level. A traditional water pump may be sized to constantly provide a level of coolant flow that is adequate for peak operating conditions. Variable speed water pumps may be used to reduce the parasitic losses on the engine caused by the water pump when less than the peak level of coolant flow is needed to maintain the engine temperature within acceptable levels.

Though variable speed water pumps are known in general, what is needed is a variable speed water pump that is configured to respond to parameters other than engine oil temperature or coolant temperature in determining a control strategy.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a vehicle is provided. The vehicle comprises a first coolant loop configured to cool an engine, an auxiliary coolant loop configured to control a temperature of at least one auxiliary component, a variable-speed pump configured to pump fluid through the first coolant loop and the auxiliary coolant loop, and a pump controller. The pump controller is configured to cause the variable-speed pump to operate at variable speed when an ambient temperature measurement meets a predetermined criteria, and to cause the variable-speed pump to operate at a full speed when an ambient temperature measurement does not meet the predetermined criteria.

In some embodiments, a method of controlling a speed of a variable-speed pump configured to provide coolant flow to a gear box cooler is provided. The method comprises monitoring an amount of driveline torque produced by a vehicle, and, in response to determining that the amount of driveline torque has exceeded a threshold amount of torque for at least a threshold amount of time, varying the speed of the pump based on the amount of driveline torque.

In some embodiments, a method of controlling a speed of a pump configured to provide coolant flow is provided. A set of sensor values is received from a plurality of sensors. More than one speed control function is executed based on the set of sensor values to generate a set of speed control values associated with the speed control functions. A speed control value is selected from the set of speed control values, and the pump is caused to operate according to the selected speed control value.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

System Overview

Figure 1:
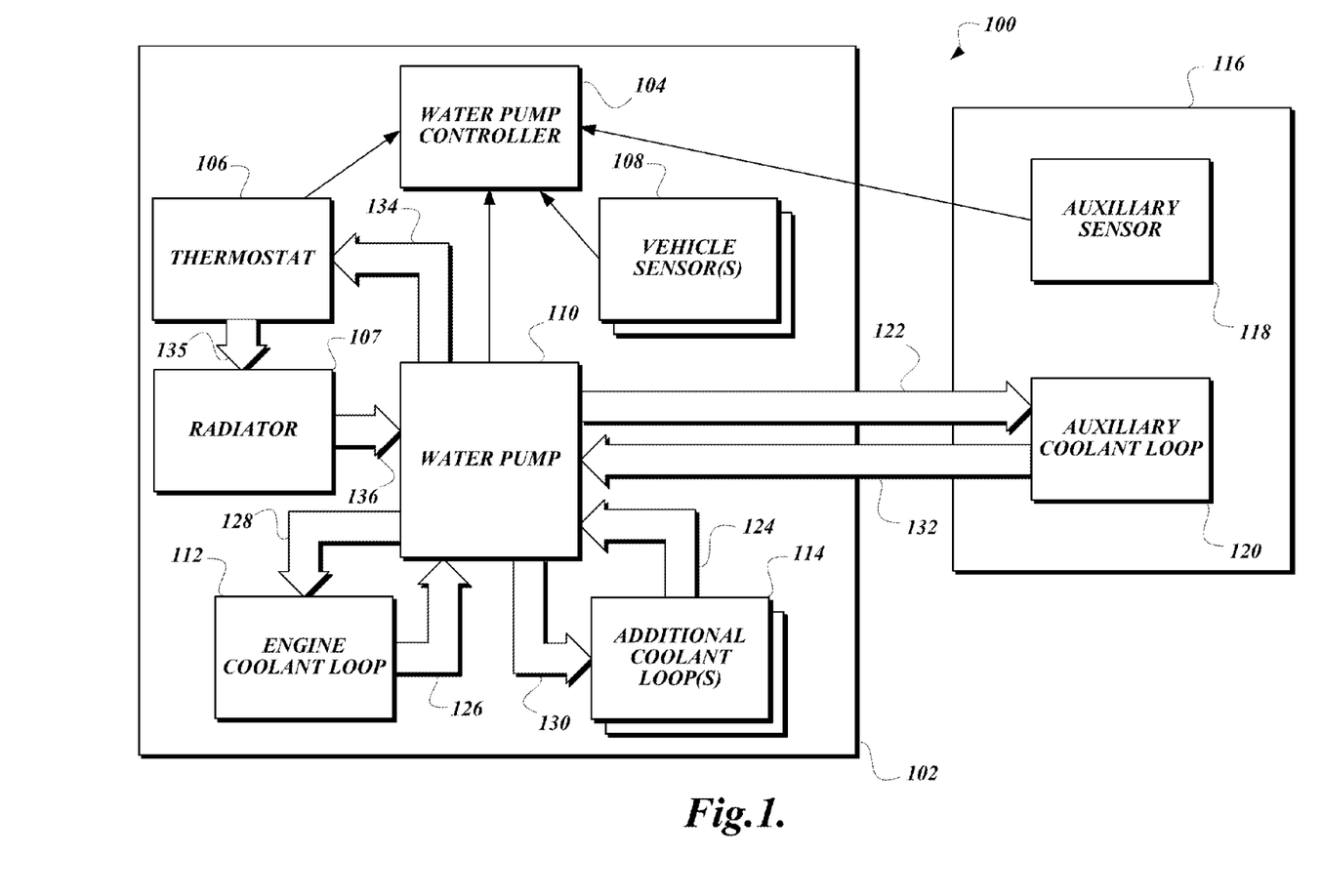
FIG. 1 is a block diagram illustrating an embodiment of a water pump management system according to various aspects of the present disclosure.

FIG. 1 is a block diagram illustrating an embodiment of a water pump management system 100 according to various aspects of the present disclosure. As illustrated, the system 100 is included within a vehicle 102 having an internal combustion engine, such as an automobile, a truck, and/or the like. The vehicle 102 includes many features known to one of ordinary skill in the art as being included in a vehicle 102, such as an engine, an operator compartment, a fuel tank, a transmission, and so on.

The illustrated vehicle 102 includes a variable speed water pump 110. The water pump 110 is connected to an engine coolant loop 112 by a coolant delivery line 128 and a coolant return line 126. The engine coolant loop 112 transfers heat from the engine to the coolant, thereby reducing the temperature of the engine. The water pump 110 is also connected to a radiator 107 via a coolant delivery line 134, a temperature-dependent valve such as a thermostat 106, a coolant delivery line 135, and a coolant return line 136. The radiator 107 is configured to transfer heat from the coolant to the surrounding environment, thereby reducing the temperature of the coolant.

The thermostat 106 is configured to interrupt or otherwise limit the flow of coolant from the water pump 110 to the radiator 107 until the coolant reaches a threshold temperature. Once the coolant reaches the threshold temperature, the thermostat 106 allows a full flow of coolant to the radiator 107. The thermostat 106 may limit coolant flow at low temperatures to limit cooling of the engine until the engine has reached a minimum efficient operating temperature. Before this operating temperature is reached, the coolant will be heated within the engine coolant loop 112 without being cooled within the radiator 107.

In some embodiments, the water pump 110 may also be connected to one or more additional coolant loops 114 by at least one coolant delivery line 130 and at least one coolant return line 124. The additional coolant loops 114 may be used to warm or cool various components of the vehicle. As one example, additional coolant loops 114 may be provided in a urea tank or a fuel tank in order to increase urea or fuel temperature to ideal levels despite low ambient temperatures. As another example, an additional coolant loop 114 may be used to provide heat from the engine to a HVAC system in order to heat the operator compartment. In these embodiments, for example, warmed coolant from the engine coolant loop 112 may be selectively routed to the urea tank, fuel tank, heater core, and/or the like. From the heated device, the coolant returns to the water pump 110. As yet another example, additional coolant loops 114 may be used to cool a gearbox, retarder, or brake components. In this embodiment, cooled coolant from the radiator 107 may be selectively routed to the gearbox, retarder, brake components, and/or the like. From the cooled device, the coolant returns to the water pump 110.

In some embodiments, the vehicle 102 may be coupled to a trailer 116. In such embodiments, the trailer 116 may include at least one auxiliary coolant loop 120 that is selectively connected to the water pump 110 via a coolant delivery line 122 and a coolant return line 132. A variety of auxiliary coolant loops 120 may be used in embodiments of the present disclosure, such as an auxiliary coolant loop used to cool an engine that powers a trailer refrigeration unit, an auxiliary coolant loop used to heat valves on a milk distribution trailer, and/or the like.

One of ordinary skill in the art will recognize that the vehicle 102 may include components connected by coolant delivery lines and/or coolant return lines in a different way than that depicted in FIG. 1. For example, in some embodiments, the coolant delivery line 135 may include other coolant lines, such as coolant delivery line 128, and at least a segment of coolant return line 126. As another example, in some embodiments, coolant may be delivered to one or more coolant loops, such as to the engine coolant loop 112, the radiator 107, and one or more additional coolant loops 114, before returning to the water pump 110. Each of the examples described is exemplary only, and one of ordinary skill in the art will recognize that other configurations are possible without departing from the scope of the present disclosure.

Embodiments of the vehicle 102 also include a water pump controller 104. The water pump controller 104 is communicatively coupled to the water pump 110, and instructs the water pump 110 to operate at a speed determined by the water pump controller 104. The water pump controller 104 may be communicatively coupled to the thermostat 106, one or more vehicle sensors 108, and one or more auxiliary sensors 118, to gather information on which to base the determination of water pump operating speed. This determination is discussed further below. The one or more vehicle sensors 108 and one or more auxiliary sensors 118 may include, but are not limited to, coolant temperature sensors, ambient temperature sensors, vehicle state sensors, and/or the like.

In one embodiment, the water pump controller 104 is provided in a separate physical component from the water pump 110, such as in an engine control module (ECM) and/or the like. In another embodiment, the water pump controller 104 may be provided within the water pump 110. In some embodiments, the water pump controller 104 may include a digital computing device that receives data from the thermostat 106 and sensors 108, 118, and processes that data to determine the water pump operating speed. In some embodiments, the water pump controller 104 may include analog or physical sensing devices or calculation devices that contribute to the determination of the water pump speed.

Figure 2:
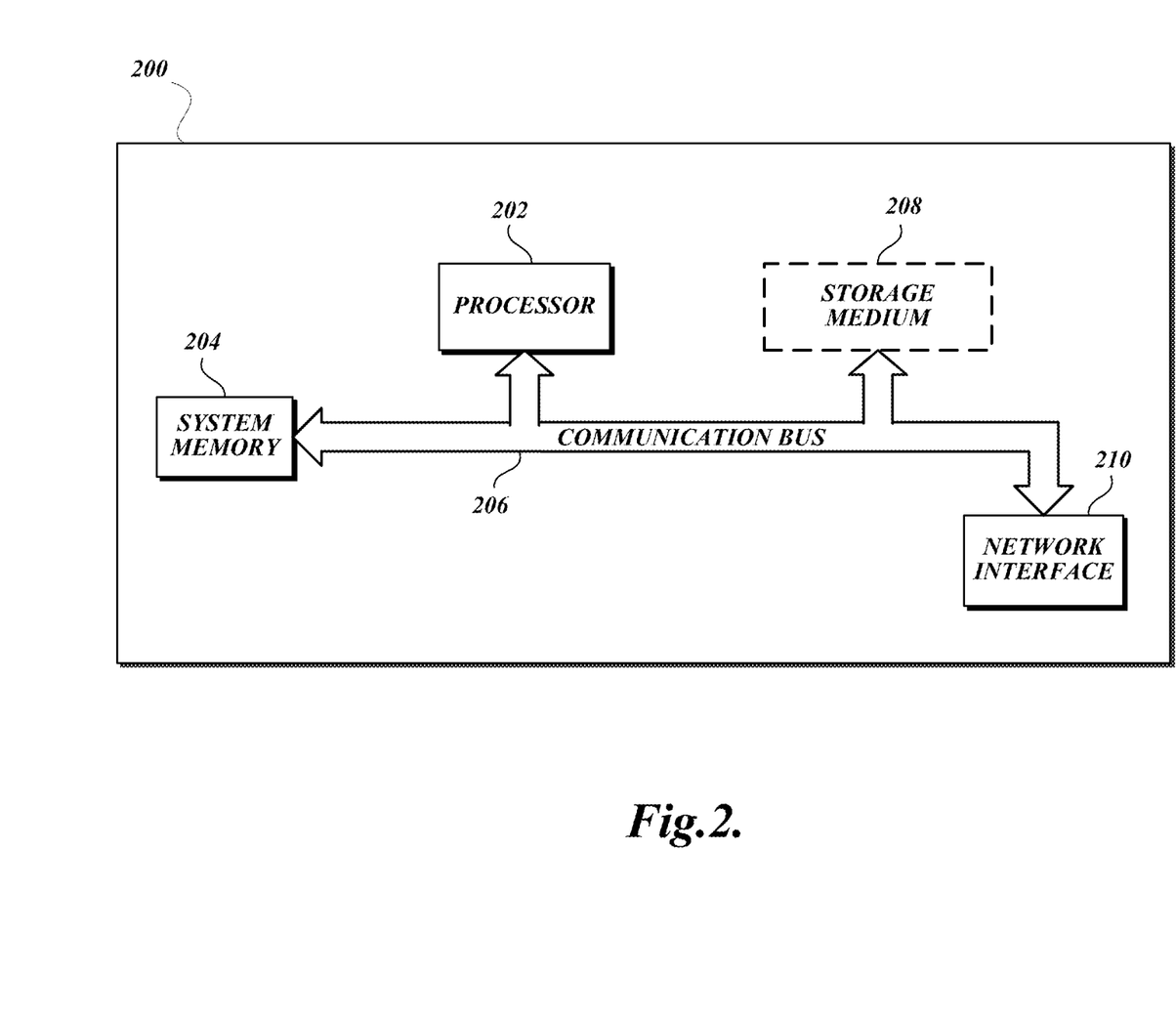
FIG. 2 illustrates an exemplary hardware architecture of a computing device suitable for use with embodiments of the present disclosure.

In some embodiments, the water pump controller 104 may be, may include, or may be a part of one or more computing devices. FIG. 2 illustrates an exemplary hardware architecture of a computing device 200 suitable for use with embodiments of the present disclosure. Those of ordinary skill in the art and others will recognize that the computing device 200 may be any one of any number of currently available or yet to be developed devices. In its most basic configuration, the computing device 200 includes at least one processor 202 and a system memory 204 connected by a communication bus 206. Depending on the exact configuration and type of device, the system memory 204 may be volatile or nonvolatile memory, such as read only memory ("ROM"), random access memory ("RAM"), EEPROM, flash memory, or similar memory technology. Those of ordinary skill in the art and others will recognize that system memory 204 typically stores data and/or program modules that are immediately accessible to and/or currently being operated on by the processor 202. In this regard, the processor 202 serves as a computational center of the computing device 200 by supporting the execution of instructions.

As further illustrated in FIG. 2, the computing device 200 may include a network interface 210 comprising one or more components for communicating with other devices over a network. Embodiments of the present disclosure may access basic services that utilize the network interface 210 to perform communications using common network protocols, such as TCP/IP, UDP, USB, Firewire, and/or the like. In some embodiments, the network may include a vehicle-wide communications network implemented using any number of different communication protocols such as, but not limited to, Society of Automotive Engineers' ("SAE") J1587, SAE J1922, SAE J1939, SAE J1708, and combinations thereof.

In the exemplary embodiment depicted in FIG. 2, the computing device 200 also includes a storage medium 208. However, services may be accessed using a computing device that does not include means for persisting data to a local storage medium. Therefore, the storage medium 208 depicted in FIG. 2 is represented with a dashed line to indicate that the storage medium 208 is optional. In any event, the storage medium 208 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and the like.

As used herein, the term "computer-readable media" includes volatile and nonvolatile and removable and nonremovable media implemented in any method or technology capable of storing information, such as computer-readable instructions, data structures, program modules, or other data. In this regard, the system memory 204 and storage medium 208 depicted in FIG. 2 are merely examples of computer-readable media.

Suitable implementations of computing devices that include a processor 202, system memory 204, communication bus 206, storage medium 208, and network interface 210 are known and commercially available. For ease of illustration and because it is not important for an understanding of the claimed subject matter, FIG. 2 does not show some of the typical components of many computing devices. In this regard, the computing device 200 may include one or more input devices. Similarly, the computing device 200 may also include one or more output devices.

Controlling a Variable-Speed Water Pump

Figure 3:
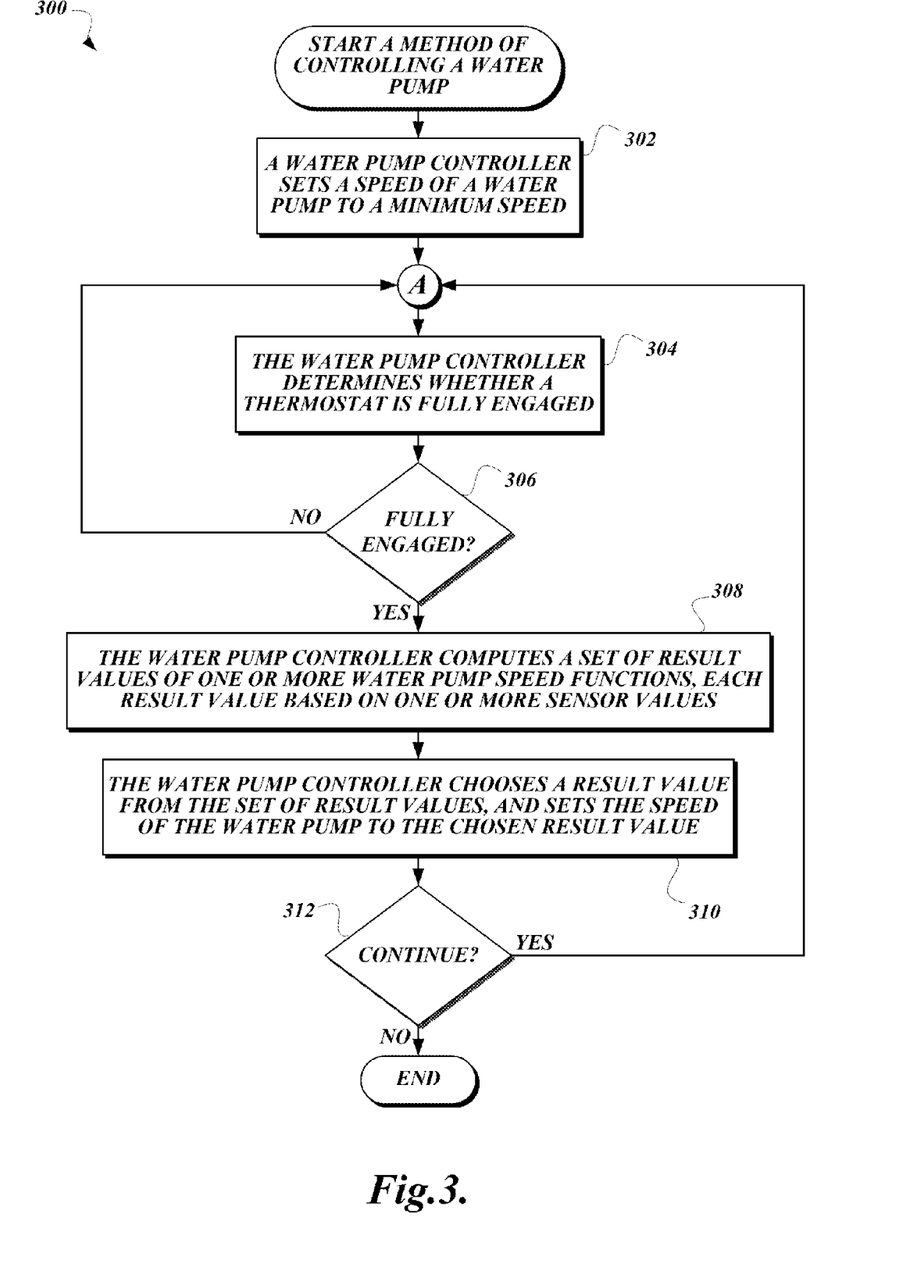
FIG. 3 illustrates an embodiment of a method of controlling a variable speed water pump according to various aspects of the present disclosure.

FIG. 3 illustrates an embodiment of a method 300 of controlling a variable speed water pump according to various aspects of the present disclosure. From a start block, the method 300 proceeds to block 302, where a water pump controller 104 sets a speed of a water pump 110 to a minimum speed. The method 300 then proceeds to a continuation terminal ("terminal A"), and then to block 304, where the water pump controller 104 determines whether a thermostat 106 is fully engaged. In some embodiments, the thermostat 106 is configured to monitor the temperature of coolant within the engine coolant loop 112. As the temperature of coolant within the engine coolant loop 112 rises, the thermostat 106 becomes more engaged, and allows more coolant to flow to the radiator 107. Once the coolant rises to a predetermined temperature, the thermostat 106 will be fully engaged and allows a maximum amount of coolant to flow to the radiator 107.

At decision block 306, if the answer to the determination made in block 304 is NO, the method 300 returns to terminal A, and repeats the determination until the answer to the determination is YES. At decision block 306, if the answer to the determination made in block 306 is YES, the method 300 proceeds to block 308.

At block 308, the water pump controller 104 computes a set of result values of one or more water pump speed functions, each result value based on one or more sensor values such as an indicated temperature of a vehicle component, an indicated ambient temperature, and/or the like. Each result value may be based on other factors as well, such as previously calculated result values for the same or other functions, a determination of whether a sensor value is rising or falling, and/or the like. Several exemplary water pump speed functions suitable for use in embodiments of the present disclosure will be discussed further below.

Next, at block 310, the water pump controller 104 chooses a result value from the set of result values, and sets the speed of the water pump 110 to the chosen result value. The water pump controller 104 may use any suitable means to choose a result value from the set of result values. In one embodiment, the water pump controller 104 may choose a highest result value from the set of result values to ensure that the greatest calculated fluid flow requirement is met, though any other suitable method for choosing a result value may be used in other embodiments, such as choosing the result value from a particular function upon detecting a particular vehicle state, and/or the like.

The method 300 then proceeds to a decision block 312, where a determination is made as to whether the method 300 should continue. In most cases, if the vehicle 102 is still operating, the determination at decision block 312 will be that the method 300 should continue. Otherwise, if the vehicle 102 is shutting down, the determination may be that the method 300 should not continue. If the determination at decision block 312 is YES, then the method 300 returns to terminal A. If the determination at decision block 312 is NO, then the method 300 proceeds to an end block and terminates.

Pump Speed as a Function of Coolant Temperature

Figure 4:
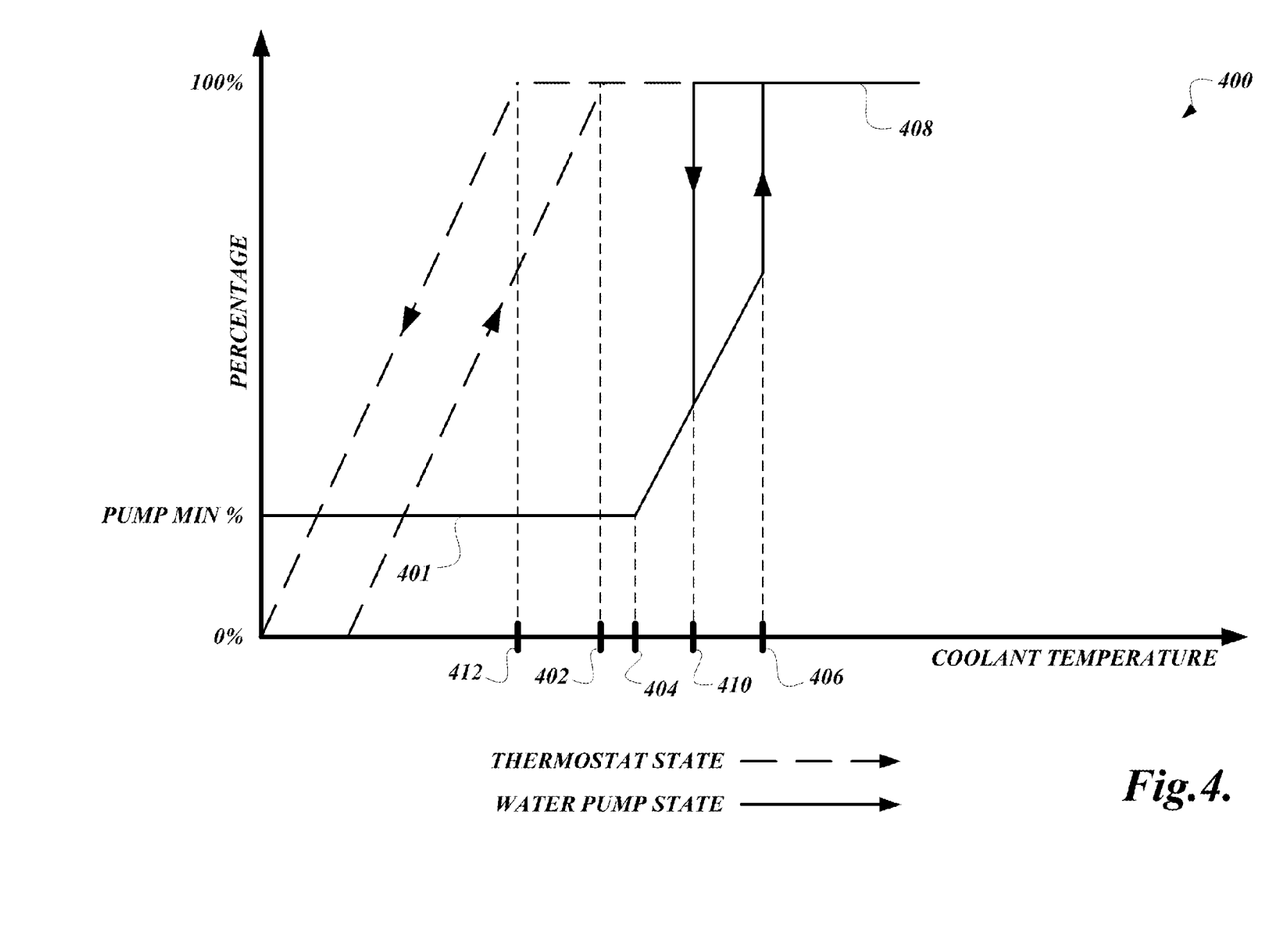
FIG. 4 is a graph that illustrates engagement percentage versus coolant temperature as may be used by various embodiments of the present disclosure.

FIG. 4 is a graph 400 that illustrates engagement percentage versus coolant temperature as may be used by various embodiments of the present disclosure. The graph 400 illustrates effects of an exemplary water pump speed function having a result value that increases as the coolant temperature increases. One of ordinary skill in the art will realize that this is only an exemplary water pump speed function, and that other water pump speed functions, including several described further below, may be used.

The graph 400 illustrates coolant temperature on the X-axis, and a percentage on the Y-axis. With respect to the solid line, the Y-axis indicates a percentage of a maximum water pump speed. With respect to the dashed line, the Y-axis indicates a percentage of thermostat engagement. When the coolant temperature is at a minimum, the thermostat is maximally disengaged, and the water pump speed is kept at a minimum water pump speed 401. As the coolant temperature rises, the thermostat engagement increases, until the coolant temperature reaches a full thermostat engagement temperature 402. Once the full thermostat engagement temperature 402 is reached, the speed of the water pump may be increased, as discussed above with respect to FIG. 3.

As the coolant temperature continues to rise above the full thermostat engagement temperature 402, a water pump speed increase temperature 404 will be reached. As the coolant temperature rises above the water pump speed increase temperature 404, the result value of the water pump speed function rises as well. In some embodiments, the result value of the water pump speed function may increase linearly to a maximum water pump speed 408. In the illustrated embodiment, the result value of the water pump speed function increases linearly until a maximum water pump speed temperature 406 is reached, at which point the result value jumps to a maximum water pump speed 408.

In the illustrated embodiment, hysteresis is used to prevent either the thermostat or water pump from cycling once a maximum engagement percentage is reached. After the coolant temperature rises past the maximum water pump speed temperature 406, the water pump speed will remain at the maximum water pump speed 408 until the coolant temperature falls to a water pump hysteresis temperature 410, at which point the linear portion of the water pump speed function will again be applied. Similarly, after the coolant temperature rises past the full thermostat engagement temperature 402, the thermostat 106 will remain fully engaged until the coolant temperature falls to a thermostat hysteresis temperature 412, at which point the thermostat engagement will fall along with the coolant temperature.

Though FIG. 4 illustrates water pump speed calculated as a function of coolant temperature, in some embodiments, similar water pump speed functions may calculate water pump speed as a function of other measured temperatures, such as fuel temperature, urea temperature, gearbox oil temperature, retarder oil temperature, and/or the like. Each of these functions may be similar to the function illustrated in FIG. 4, and any or all of these functions may use different water pump speed increase temperatures, maximum water pump speed increase temperatures, water pump hysteresis temperatures, and/or the like.

Pump Speed as a Function of HVAC Configuration

Figure 5:
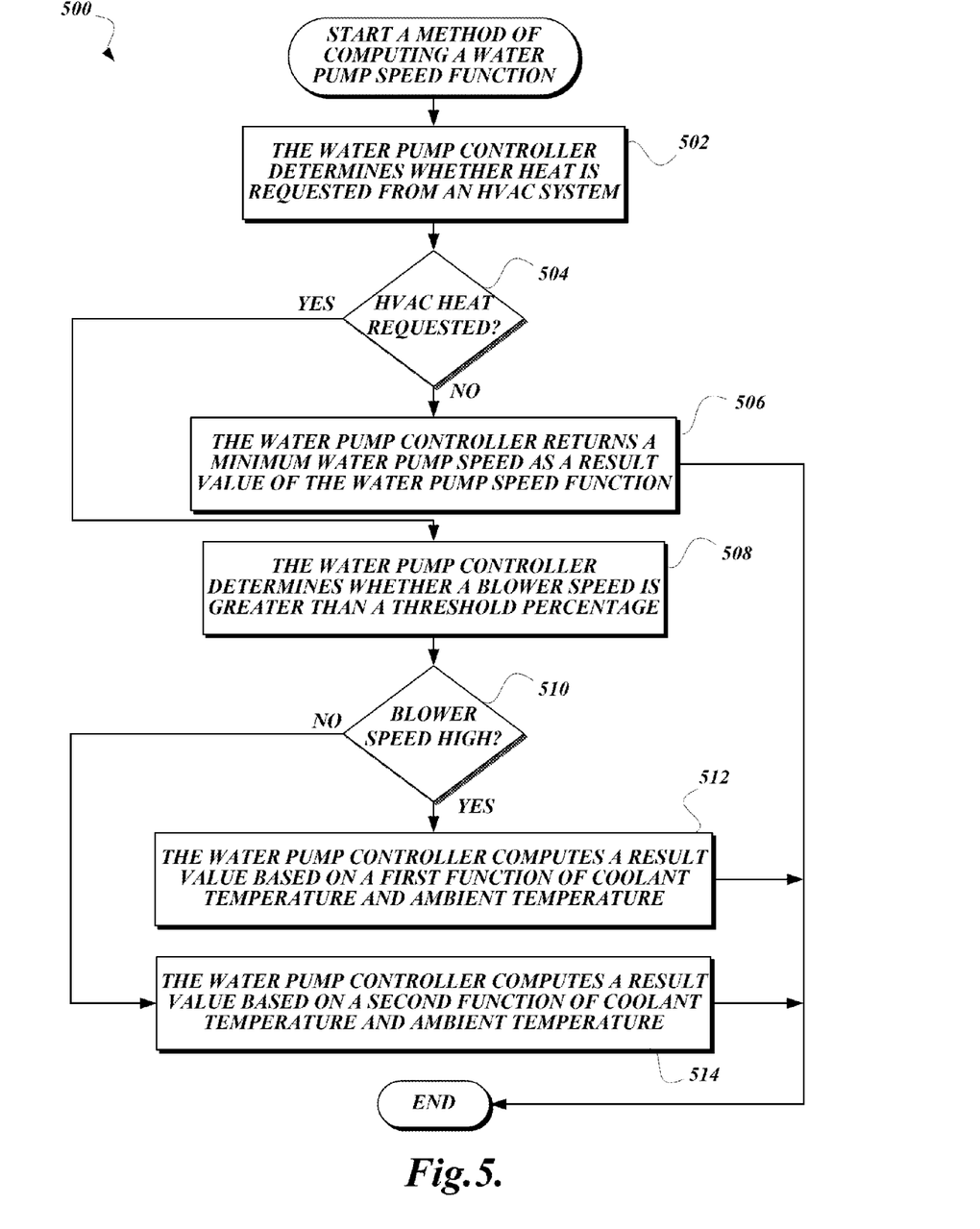
FIG. 5 illustrates an embodiment of a method that calculates an exemplary water pump speed function according to various aspects of the present disclosure.

FIG. 5 illustrates a method 500 that calculates another exemplary water pump speed function according to various aspects of the present disclosure. Unlike the previously illustrated function of FIG. 4, the method 500 utilizes data obtained from more than one vehicle sensor, and contains a greater amount of logic. Broadly described, the method 500 bases a result of the water pump speed function on whether an operator of the vehicle is running a heater for the operator compartment. If so, the method 500 bases the result on settings of the heater, and may provide more heat from the engine to the heater when needed.

From a start block, the method 500 proceeds to block 502, where the water pump controller 104 determines whether heat is requested from an HVAC system. The water pump controller 104 may be communicatively coupled to a vehicle sensor 108 that reports the setting of the HVAC system. One of ordinary skill in the art will appreciate that the vehicle sensor 108 may be a part of the HVAC system, and that the water pump controller 104 may be communicatively coupled to the vehicle sensor 108 via the HVAC system. At decision block 504, a test is performed based on the determination of whether heat is requested from the HVAC system.

In one embodiment, if the answer to the test at decision block 504 is NO, then the method 500 proceeds to block 506, where the water pump controller 104 returns a minimum water pump speed as a result value of the water pump speed function. The minimum water pump speed is returned so that, when the water pump controller 104 is choosing a result value as in block 310 discussed above, the HVAC-related water pump speed function will not contribute to raising the water pump speed above its minimum speed if heat is not requested from the HVAC system. In other embodiments, the method 500 may indicate that the result value of the method 500 should not contribute to determining the water pump speed in another way, such as setting a flag, returning a null or zero value, and/or the like. The method 500 then proceeds to an end block and terminates. One of ordinary skill in the art will understand that even though the method 500 is illustrated as terminating at the end block, in some embodiments, the method 500 may be executed more than once, such as in a repeating fashion, loop, and/or the like, once the method 500 reaches the end block.

Otherwise, if the answer to the test at decision block 504 is YES, the method proceeds to block 508, where the water pump controller 104 determines whether a blower speed is greater than a threshold percentage. Similar to the discussion above, the water pump controller 104 may obtain the blower speed from a vehicle sensor 108 coupled to some part of the HVAC system. The threshold percentage may be stored in the water pump controller 104, or may be retrieved by the water pump controller 104 from a storage medium. An operator may be able to change the threshold percentage to obtain different performance characteristics.

At decision block 510, a test is performed based on the result of the determination made in block 508 as to whether the blower speed is greater than the threshold percentage. If the answer to the test in decision block 510 is YES, the method 500 proceeds to block 512, where the water pump controller 104 computes a result value based on a first function of coolant temperature and ambient temperature. If the answer to the test in decision block 510 is NO, the method 500 proceeds to block 514, where the water pump controller 104 computes a result value based on a second function of coolant temperature and ambient temperature. In other words, the water pump controller 104 will use a different function to compute the result value if the blower is set to a high speed (more heat is desired in the operating compartment) than if the blower is set to a low speed. As discussed above, the coolant temperature and ambient temperature may be obtained from one or more vehicle sensors 108.

After block 506, 512 or 514, the method 500 proceeds to a decision block 516, where a determination is made as to whether the method 500 should continue. In most cases, if the vehicle 102 is still operating, the determination at decision block 516 will be that the method 500 should continue. Otherwise, if the vehicle 102 is shutting down, the determination may be that the method 500 should not continue. If the determination at decision block 516 is YES, then the method 500 returns to block 502. If the determination at decision block 516 is NO, then the method 500 proceeds to an end block and terminates.

Figure 6A:
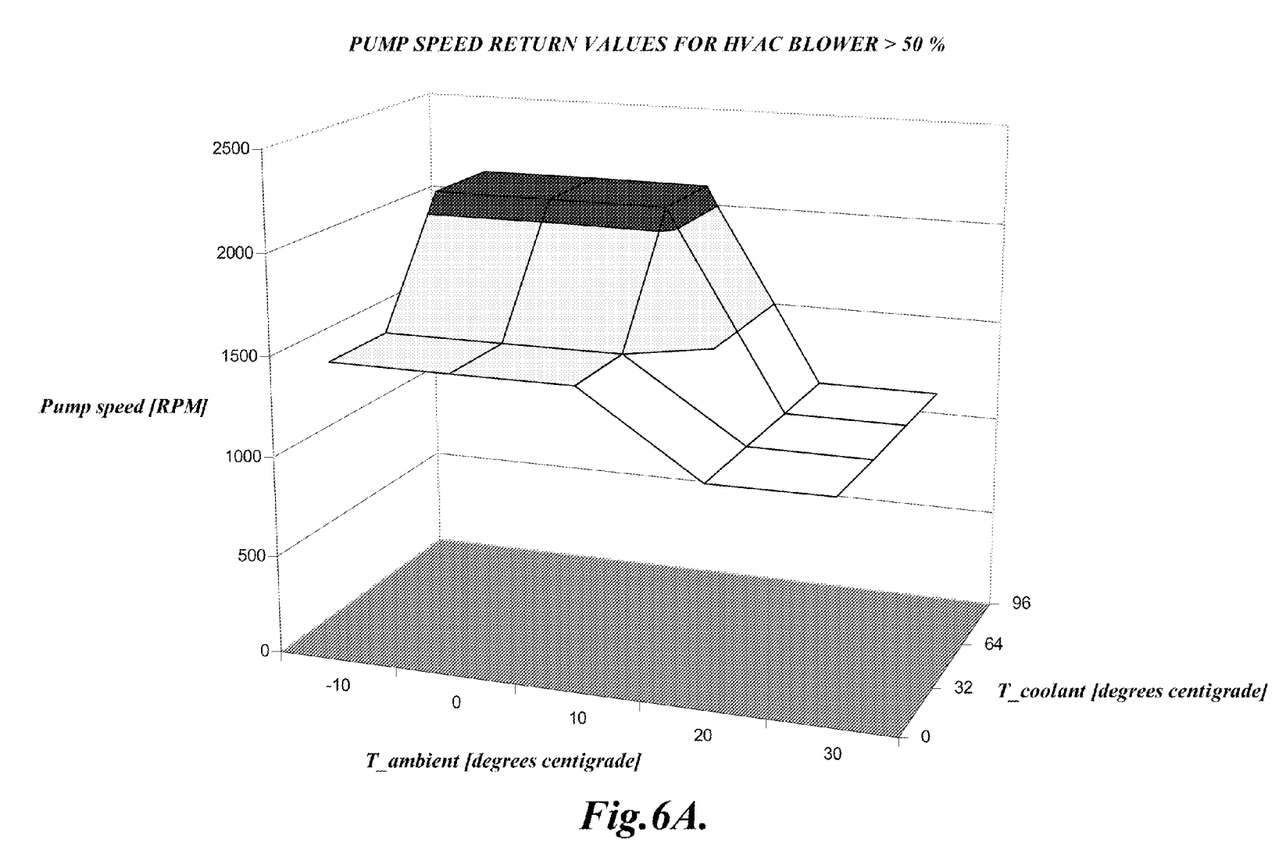
FIGS. 6A and 6B are graphs that illustrate fan speed versus ambient temperature and coolant temperature suitable for use with embodiments of the method illustrated in FIG. 5.
Figure 6B:
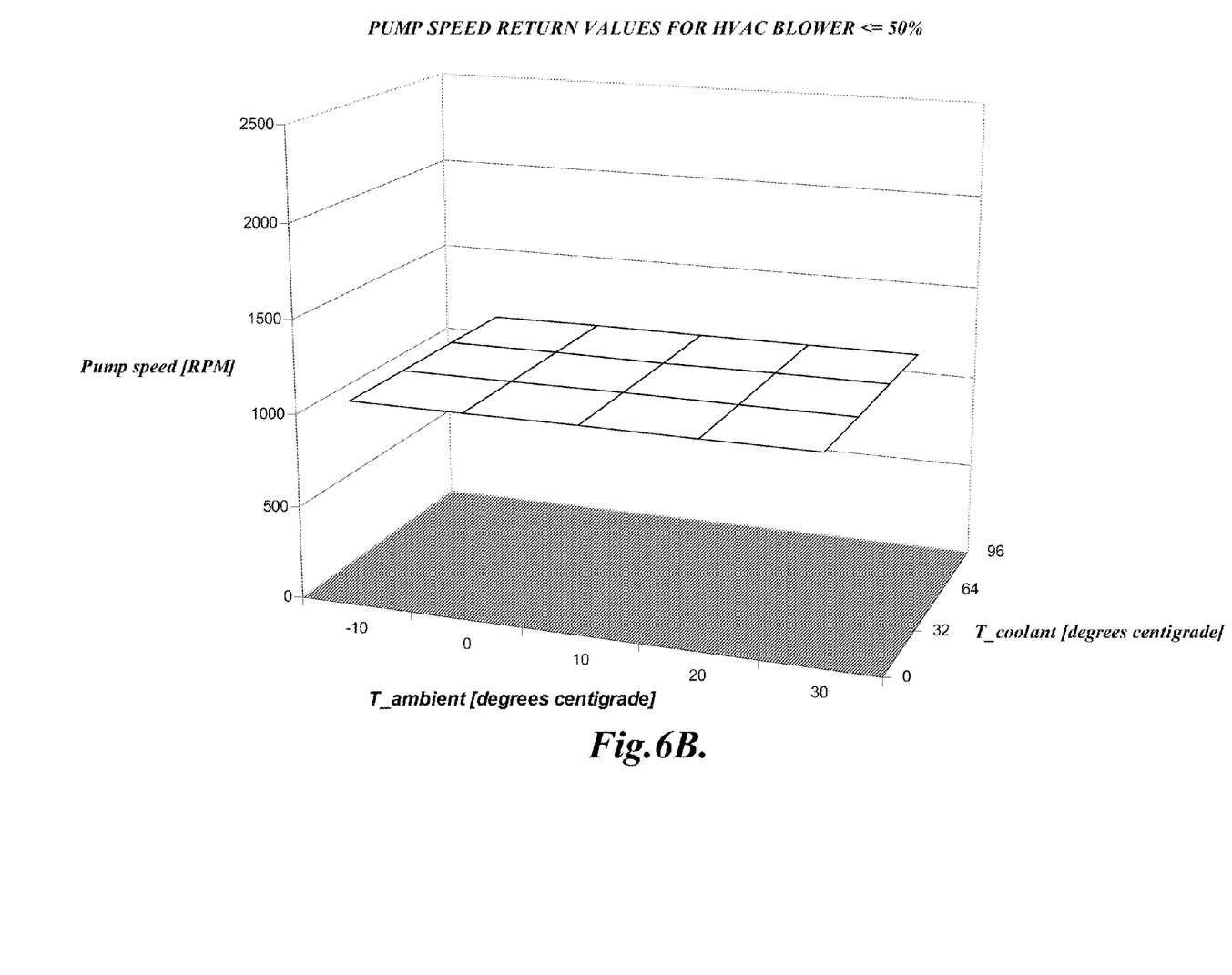

The first function and the second function may include similar calculations, or may be quite different. For example, FIG. 6A illustrates one embodiment of a first function, and FIG. 6B illustrates one embodiment of a second function, for an embodiment in which the threshold percentage is 50% of maximum blower speed. The first function will be used when the HVAC blower is set to a high speed, such as when an operator wants the operator compartment to heat up quickly, or when the ambient temperature is particularly low. Conversely, the second function will be used when the HVAC blower is set to a low speed, such as when the operator is not requesting much heat from the HVAC system.

For the first function illustrated in FIG. 6A, the return value will be highest when the ambient temperature is low, which reflects the need for additional heater capacity to improve operator compartment comfort. If the ambient temperature is low but the coolant temperature is also low, the return value is not quite as high, as the coolant will not be as effective in providing heat to the HVAC system until its temperature increases. If the ambient temperature is high, the return value will remain low. For the second function illustrated in FIG. 6B, the return value remains consistently low, regardless of the ambient temperature or the coolant temperature. One of ordinary skill in the art will recognize that, in other embodiments, other functions may be used. In one embodiment, the return values for each function may be stored on a computer-readable medium in a lookup table. In another embodiment, the return values for each function may be specified by mathematical logic.

Pump Speed as a Function of Driveline Torque

Figure 7A:
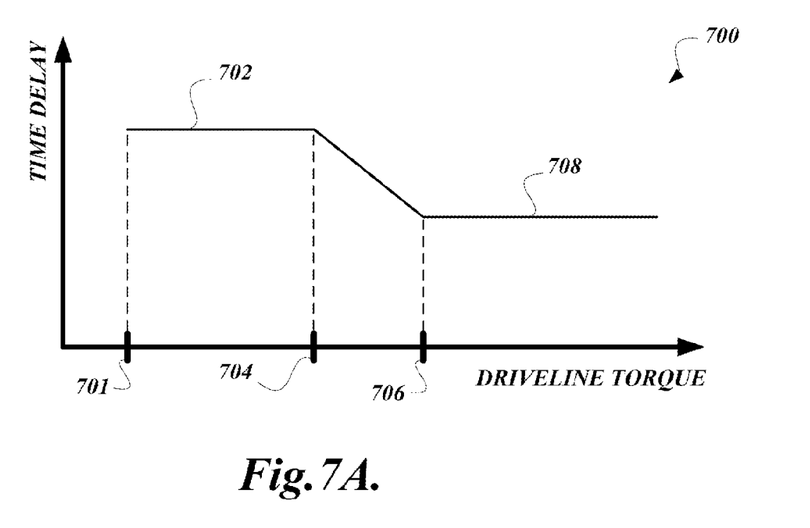
FIGS. 7A and 7B illustrate an embodiment of a method that calculates an exemplary water pump speed function that returns a result value associated with driveline torque according to various aspects of the present disclosure.
Figure 7B:
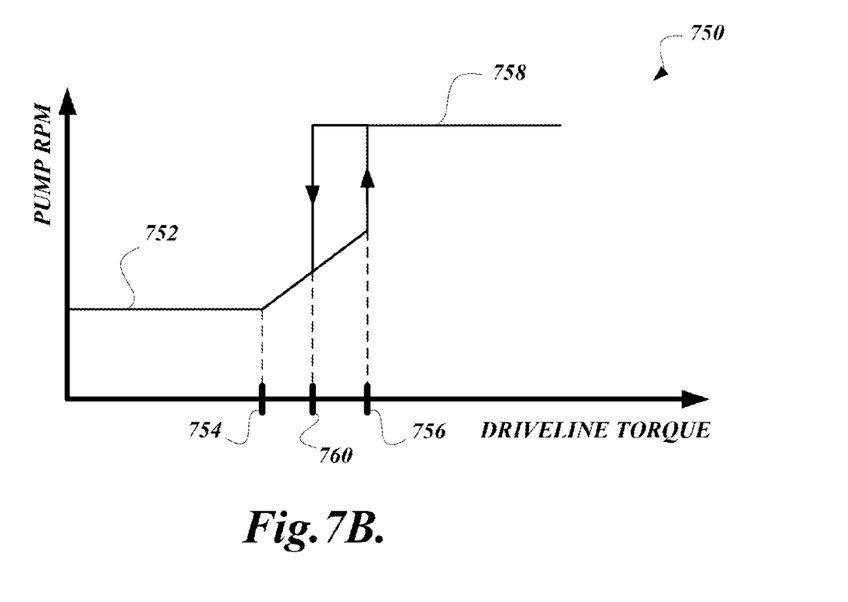

FIGS. 7A-7B collectively illustrate an embodiment of a water pump speed function that returns a result value associated with driveline torque. Such a water pump speed function may be useful in a vehicle 102 in which the water pump 110 provides coolant to a transmission or gearbox cooler. Broadly speaking, the water pump speed function illustrated in FIGS. 7A-7B may be used to increase the water pump speed when the driveline torque is higher than a threshold value for a threshold amount of time. The threshold amount of time may vary based on the amount of torque currently being generated. For example, the threshold amount of time may be lower when the amount of torque is higher, so that a delay before increasing the speed of the water pump is reduced in more extreme operating conditions.

As discussed above, the driveline torque may be obtained by a vehicle sensor 108 associated with the driveline. In some embodiments, the driveline torque may be obtained from an engine control unit that monitors such values, and transmitted to the water pump controller 104 via a vehicle bus. In some embodiments, an absolute value of the driveline torque may be used, so that the water pump 110 will provide additional coolant flow to the gearbox cooler both when the engine is providing high torque to the drivetrain and during engine braking conditions. In some embodiments, the time delay may be measured by the water pump controller 104 starting a timer once a breach of the threshold driveline torque is detected.

FIG. 7A illustrates a graph 700 of time delay versus torque according to various aspects of the present disclosure. When the driveline torque is below an activation torque threshold 701, it may not be desired for the present water pump speed function to affect the speed of the water pump 110. Accordingly, when the driveline torque is below the activation torque threshold 701, there may not be any value for the time delay. Once the driveline torque rises above the activation torque threshold 701, a high time delay 702 will be used until the driveline torque rises above a lower torque threshold 704. In other words, when the driveline torque is in a relatively low range between the activation torque threshold 701 and the lower torque threshold 704, the high time delay 702 will be used so that the present water pump speed function will wait a relatively longer time before affecting the speed of the water pump 110.

Once the driveline torque rises above the lower torque threshold 704, the time delay decreases as a function of the driveline torque, until the driveline torque reaches an upper torque threshold 706. Once the driveline torque rises above the upper torque threshold 706, a low time delay 708 is used. In other words, as the driveline torque increases and the stress on the transmission or gearbox increases, a lower time delay will be used before the present water pump speed function affects the speed of the water pump 110. Above the upper torque threshold 706, a consistent low time delay 708 is used to ensure that the present water pump speed function will quickly affect the speed of the water pump 110.

FIG. 7B illustrates a graph 750 of water pump speed versus torque according to various aspects of the present disclosure. In some embodiments, after the time delay discussed with respect to FIG. 7A has been reached, the function illustrated in FIG. 7B will be used to return a water pump speed value. As discussed above, in some embodiments the torque illustrated in the graph 750 may be an absolute value of driveline torque so that the purposes of the function may be served both during conditions of high torque applied by the engine and during conditions of engine braking. At relatively low torque values, a low water pump speed 752 may be returned. Once driveline torque rises above a lower torque threshold 754, the return value will increase until an upper torque threshold 756 is reached, at which point a maximum water pump speed 758 may be returned. Similar to the discussion above, as driveline torque falls, the maximum water pump speed 758 may be maintained as the return value until a water pump hysteresis torque 760 is reached, to prevent water pump cycling.

Pump Speed Based on Trailer Coolant Loops

In some embodiments, operator-defined setpoints may be used to either activate or deactivate the variability of the water pump 110 in certain conditions. For example, in a system 100 that includes a trailer 116 and an auxiliary coolant loop 120 associated with the trailer 116, an operator may choose to sacrifice the fuel economy gain of a variable speed water pump 110 in order to have full coolant flow for the auxiliary coolant loop 120 in certain conditions. For example, if the auxiliary coolant loop 120 cools an engine on a refrigeration unit, it may be important that the auxiliary coolant loop 120 receives full coolant flow if the ambient temperature is particularly high. As another example, if the auxiliary coolant loop 120 heats valves on a milk distribution trailer, it may be important that the auxiliary coolant loop 120 receives full coolant flow if the ambient temperature is particularly low.

Accordingly, in some embodiments, the water pump controller 104 may compare an ambient temperature received from a vehicle sensor 108 to one or more setpoint temperatures, and may set the water pump 110 to run at full speed if the ambient temperature is not in a range indicated by the setpoint temperatures. For example, if the auxiliary coolant loop 120 heats valves on a milk distribution trailer, a setpoint temperature may be set at 32 degrees Fahrenheit. If the ambient temperature falls below the setpoint temperature, the water pump controller 104 may set the water pump 110 to run at full speed. If the ambient temperature is above the setpoint temperature, the water pump controller 104 may use one or more methods, including the methods described above, to determine a speed for the variable speed water pump 110.

As another example, if the auxiliary coolant loop 120 cools an engine on a refrigeration device, a setpoint temperature may be set at 72 degrees Fahrenheit. If the ambient temperature rises above the setpoint temperature, the water pump controller 104 may set the water pump 110 to run at full speed. If the ambient temperature is below the setpoint temperature, the water pump controller 104 may use one or more methods, including the methods described above, to determine a speed for the variable speed water pump 110.

As stated above, one or more setpoints may be used. For example, a high setpoint and a low setpoint may both be used. In some such embodiments, the water pump 110 would be operated at a variable speed when the ambient temperature is between the setpoints, and would be operated at full speed if the ambient temperature is not between the setpoints. In other such embodiments, the water pump 110 would be operated at a full speed when the ambient temperature is between the setpoints, and would be operated at a variable speed if the ambient temperature is not between the setpoints. In some embodiments, the water pump 110 may also be set to full speed if the ambient temperature is between the two setpoints and a power take off device is engaged. In some embodiments, the water pump 110 may be set to full speed if the ambient temperature is between the two setpoints and a power take off device is engaged.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer readable storage medium associated with a computing device.

While illustrative embodiments have been illustrated and described, it will be appreciated that various changes can be made therein without departing from the spirit and scope of the invention as claimed.

The embodiments of the invention in which an exclusive property or privilege is claimed are defined as follows:

1. A method of controlling a speed of a pump configured to provide coolant flow, the method comprising:
   receiving a set of sensor values from a plurality of sensors;
   executing at least a first speed control function, a second speed control function, a third speed control function, a fourth speed control function, a fifth speed control function, and a sixth speed control function to generate a set of speed control values associated with the first, second, third, fourth, fifth, and sixth speed control functions, wherein the first, second, third, fourth, fifth, and sixth speed control functions are each based on values from the set of sensor values, and wherein the set of speed control values includes more than one speed control value;
   selecting a speed control value from the set of speed control values; and
   causing the pump to operate at a speed according to the selected speed control value;
   wherein the first, second, third, fourth, fifth, and sixth speed control functions are executed and the set of speed control values, that includes more than one speed control value, is generated before selecting the speed control value from the set of speed control values;

wherein the first speed control function determines a speed control value based on a coolant temperature, an ambient temperature, an HVAC blower speed, and a heat request;

wherein the second speed control function determines a speed control value based on a driveline torque value;

wherein the third speed control function determines a speed control value based on a fuel temperature value;

wherein the fourth speed control function determines a speed control value based on a urea temperature value;

wherein the fifth speed control function determines a speed control value based on a gearbox oil temperature value; and wherein the sixth speed control function determines a speed control value based on a retarder oil temperature value.

2. The method of claim 1, wherein selecting a speed control value from the set of speed control values includes selecting a maximum speed control value from the set of speed control values.

3. The method of claim 1, further comprising executing a seventh speed control function that compares an ambient temperature value to a low ambient temperature threshold and a high ambient temperature threshold.

4. The method of claim 3, wherein executing the seventh speed control function includes:

determining whether the ambient temperature value is between the low ambient temperature threshold and the high ambient temperature threshold;

in response to determining that the ambient temperature value is between the low ambient temperature threshold and the high ambient temperature threshold, returning a first speed control value as a result of the seventh speed control function; and in response to determining that the ambient temperature value is not between the low ambient temperature threshold and the high ambient temperature threshold, returning a second speed control value different from the first speed control value as the result of the seventh speed control function.

5. The method of claim 1, wherein the set of sensor values include the driveline torque value, and wherein the second speed control function determines whether the driveline torque value has been greater than a threshold torque value for a predetermined amount of time.

\* \* \* \* \*